United States Patent

Yamamoto

[11] Patent Number: 6,076,793
[45] Date of Patent: Jun. 20, 2000

[54] CUP HOLDER USED FOR VEHICLE

[75] Inventor: Yasuo Yamamoto, Tochigi-ken, Japan

[73] Assignee: Nifco Inc., Yokohama, Japan

[21] Appl. No.: 09/394,713

[22] Filed: Sep. 13, 1999

[30] Foreign Application Priority Data

Sep. 14, 1998 [JP] Japan .................... 10-259948

[51] Int. Cl.⁷ .................... A47K 1/08; A47F 5/00
[52] U.S. Cl. .................... 248/311.2; 248/315; 224/926
[58] Field of Search .................... 248/311.2, 315; 224/281, 282, 926; 297/188.17

[56] References Cited

U.S. PATENT DOCUMENTS

| | | | |
|---|---|---|---|
| 4,981,277 | 1/1991 | Elwell | 248/311.2 |
| 5,489,054 | 2/1996 | Schiff | 248/311.2 |
| 5,800,011 | 9/1998 | Spykerman | 248/311.2 |
| 5,820,094 | 10/1998 | Tanaka | 248/311.2 |
| 5,876,007 | 3/1999 | Lancaster et al. | 248/311.2 |
| 5,988,579 | 11/1999 | Moner, Jr. et al. | 248/311.2 |

FOREIGN PATENT DOCUMENTS 3-12592   3/1991   Japan .
10-95263  4/1998   Japan .

*Primary Examiner*—Ramon O. Ramirez
*Assistant Examiner*—Jerome A. DeLuca
*Attorney, Agent, or Firm*—Kanesaka & Takeuchi

[57] ABSTRACT

A cup holder used in a vehicle includes a storing portion fixed to the vehicle, a slider slidably accommodated in the storing portion, a cup inserting hole provided in the slider, an arm rotatably disposed around a shaft attached to the slider near the cup inserting hole, and a diameter changing device. The diameter changing device includes a tracing portion fixed to the arm to slide along an inner side surface of the storing portion, a spring for urging the tracing portion toward the inner side surface of the storing portion to thereby allow an end of the arm to rotate in a direction of reducing an inner diameter of the cup inserting hole, and a cam surface protruded from the inner side surface of the storing portion. When the slider is drawn out from the storing portion, the end of the arm is rotated by the cam surface in a direction of enlarging the inner diameter of the cup inserting hole. Generation of a noise at the time of pulling out the slider from the storing portion is prevented.

5 Claims, 7 Drawing Sheets

CUP HOLDER USED FOR VEHICLE

BACKGROUND OF THE INVENTION AND RELATED ART STATEMENT

The present invention relates to a cup holder used in a vehicle, and more particularly, a cup holder in which generation of a noise or an abnormal sound at the time of pulling out of the cup holder is prevented.

Conventionally, for example, as disclosed in Japanese Utility Model Publication (KOKOKU) No. H3-12592, there has been known a cup holder used in a vehicle, which includes a slider, a cup inserting hole and a torsion coil spring.

The slider is slidably accommodated in a storing section in an interior of the vehicle. The cup inserting hole is formed in a C shape by cutting out a side portion of the slider.

An arm is attached to a shaft at the side portion of the slider, and enters into and comes out from the cup inserting hole through the open side portion of the cup inserting hole, so that the arm can enlarge and reduce an inner diameter of the cup inserting hole.

The torsion coil spring is used for allowing the arm to be projected from the open side portion of the cup inserting hole when the slider is drawn out from the storing section, so as to enlarge the inner diameter of the cup inserting hole.

In the conventional cup holder as described above, however, when the slider is drawn out from the storing section, the arm is projected from the open side portion of the cup inserting hole by a spring force of the torsion coil spring.

At this time, there has been a problem that the arm strikes an inner surface of the storing section of the interior of the vehicle to generate a noise.

Incidentally, although the cup holder is not a slider type, there has been also known a cup holder in which the arm is made retractable by utilizing a cam groove as disclosed in Japanese Patent Publication (KOKAI) No. H10-95263.

The present invention has been made in view of the above problem, and an object of the present invention is to provide a cup holder, in which generation of a noise at the time of pulling out a slider can be prevented.

Another object of the present invention is to provide a cup holder as stated above, wherein an amount of enlarging an inner diameter of the cup inserting hole can be changed in accordance with an amount of withdrawal of the slider.

Further objects and advantages of the invention will be apparent from the following description of the invention.

SUMMARY OF THE INVENTION

To achieve the above objects, according to a first aspect of the present invention, the present invention provides a cup holder having diameter enlarging or changing means. The diameter enlarging means is formed of a tracing portion, a spring and a cam surface.

The tracing portion is fixed to the arm at a side opposite to the arm with respect to a shaft interposed therebetween, and extends along an inner side surface, i.e. side plate, of a storing section, i.e. case.

The spring urges the tracing portion toward the inner surface of the storing section so as to rotate one end of the arm, i.e. arm main body, in a direction of reducing an inner diameter of the cup inserting hole.

The cam surface protrudes from the inner surface of the storing section. The cam surface presses the tracing portion against the urging force of the spring in case the slider is drawn out from the storing section, so that the one end of the arm is rotated in the direction of enlarging the inner diameter of the cup inserting hole.

According to a second aspect of the invention, in addition to the first aspect of the invention, the cam surface includes a plurality of steps protruding from the inner surface of the storing section.

DETAILED DESCRIPTION OF PREFERRED EMBODIMENTS

Hereinafter, embodiments of the present invention will be explained with reference to the attached drawings.

Figure 1:
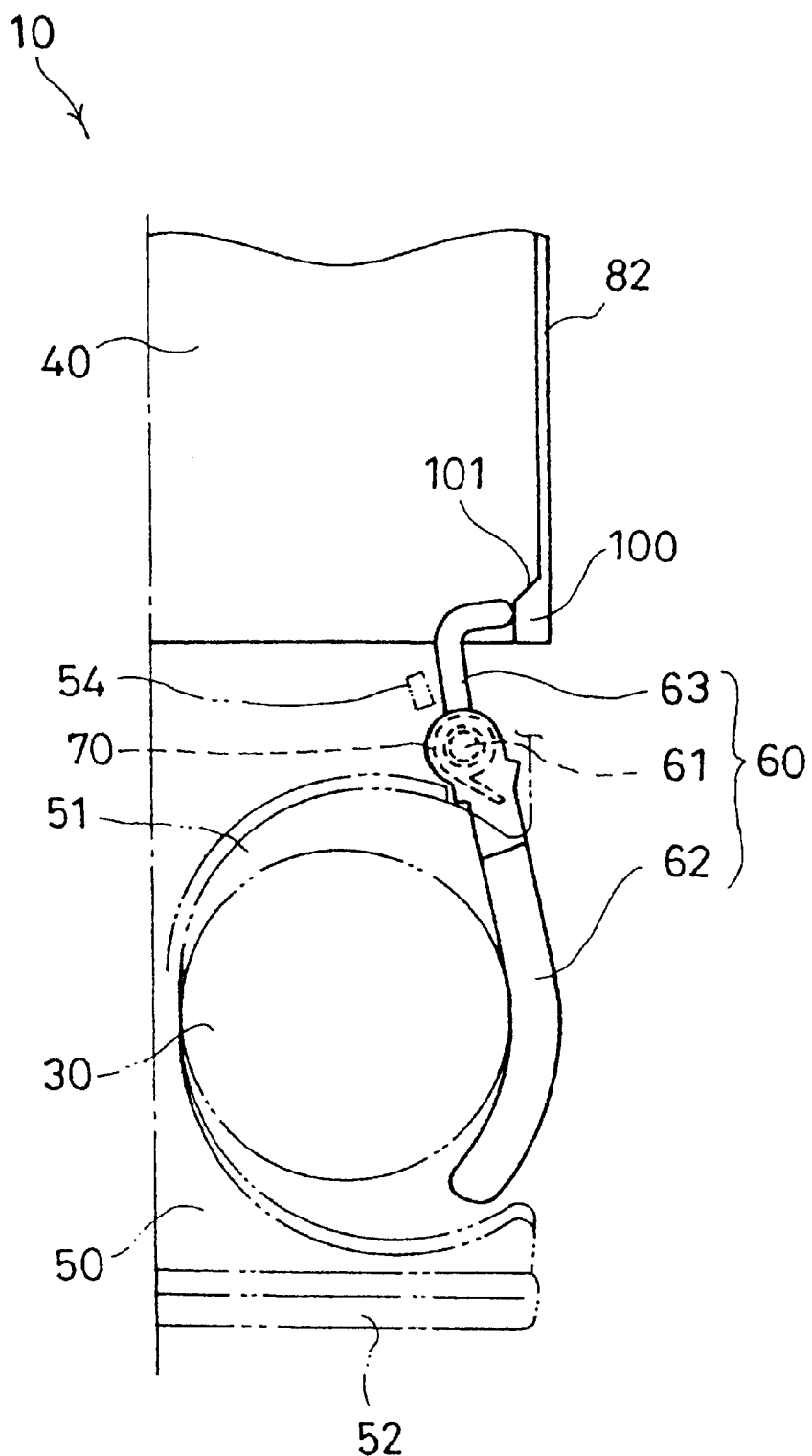
FIG. 1 is a partial plan view of a cup holder of a first embodiment of the present invention.
Figure 2:
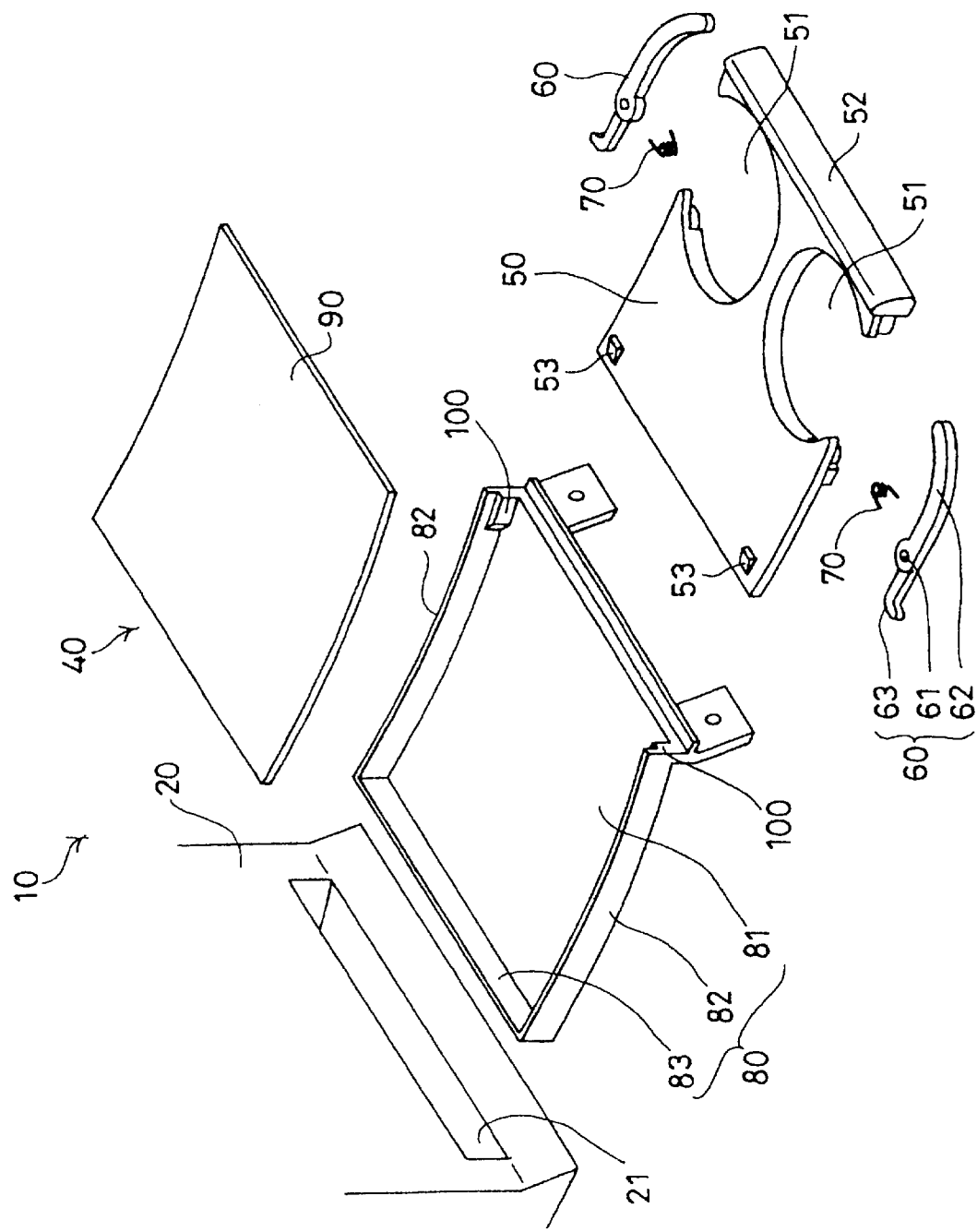
FIG. 2 is an exploded perspective view of the cup holder.
Figure 3:
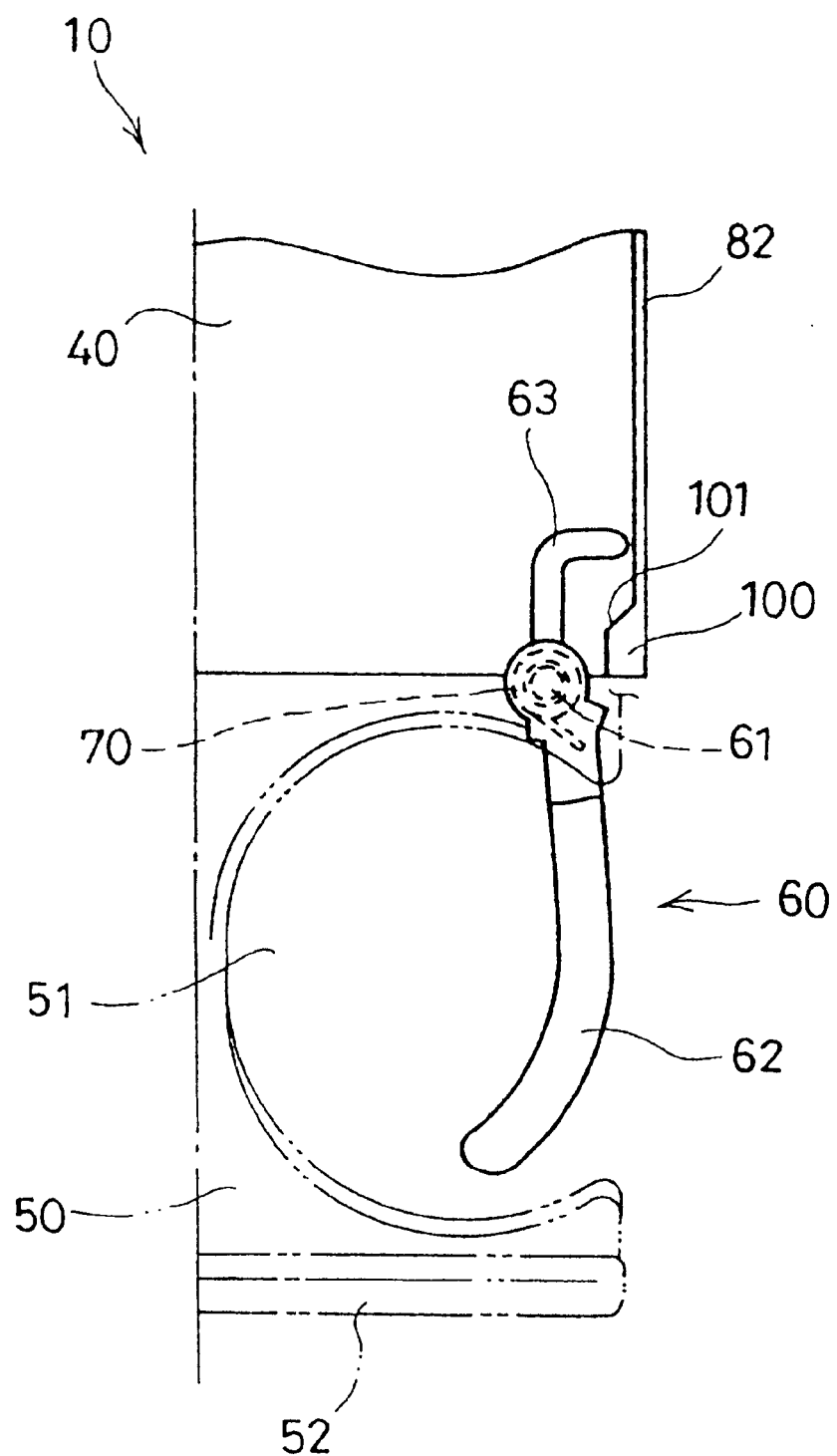
FIG. 3 is a partial plan view of the cup holder corresponding to FIG. 1, showing a storing condition of a slider.
Figure 4:
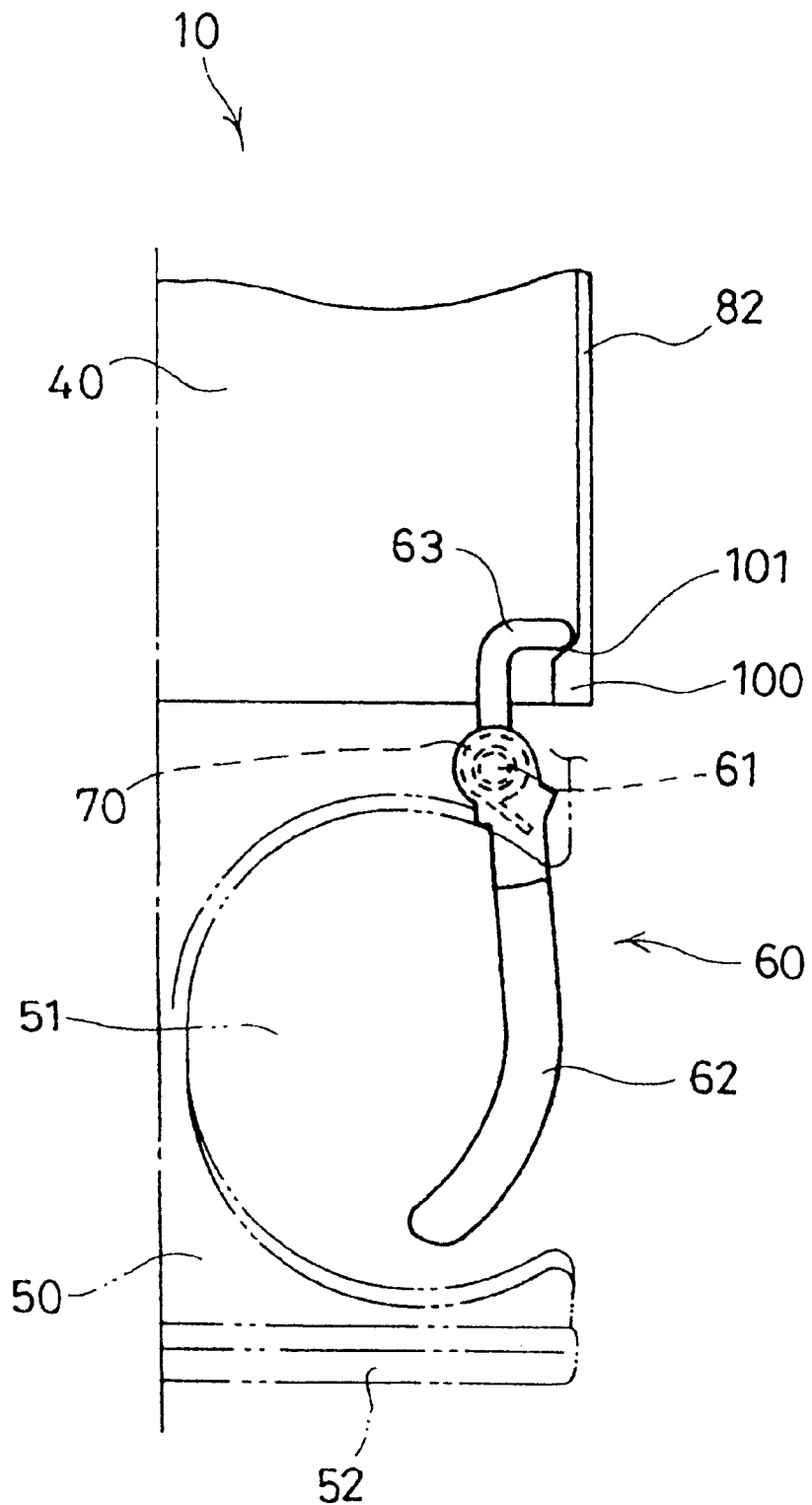
FIG. 4 is a partial plan view of the cup holder corresponding to FIG. 1, showing a condition that the slider is in a middle of being drawn.
Figure 5:
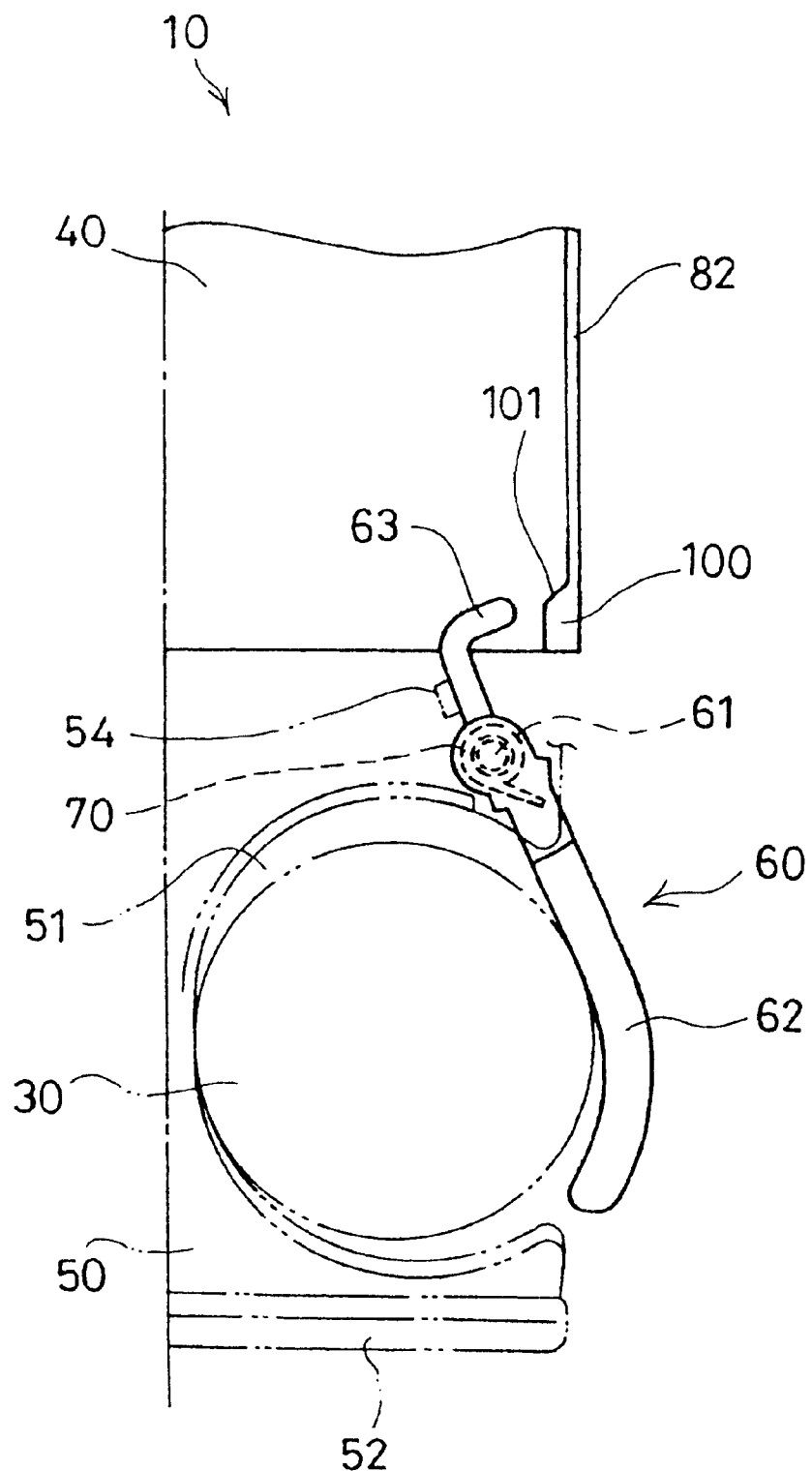
FIG. 5 is a partial plan view of the cup holder corresponding to FIG. 1, showing a condition that the slider is drawn out and a cup is inserted.

FIGS. 1 through 5 show a first embodiment of the present invention. FIG. 1 is a partial plan view of a cup holder. FIG. 2 shows an exploded perspective view of the cup holder. FIGS. 3 through 5 correspond to FIG. 1, and are provided for explaining sliding conditions of the slider, wherein FIG. 3 is a partial plan view showing a storing condition of the slider; FIG. 4 is a partial plan view showing a condition that the sliding is in a middle of being drawn; and FIG. 5 is a partial plan view showing a condition that the slider is drawn out and a cup is inserted.

In the drawings, numeral 10 designates a cup holder.

As shown in FIG. 2, the cup holder 10 is fixed to be retained in a center console 20 in an interior of, for example, an automobile, and as shown in FIG. 5, the cup holder 10 is used by drawing out and inserting a cup 30 therein.

Incidentally, although the automobile is exemplified as a vehicle in which the cup holder is used, the vehicle is not limited to the automobile, and can be a train.

Also, although the center console 20 in the interior of the vehicle is exemplified as a portion to which the cup holder 10 is installed, the cup holder may be attached to a front console, a seat, an inner wall of a door, or other inner walls of the interior of the vehicle.

Furthermore, although not shown in the figures, the cup 30 can be a paper cup, a plastic cup, a bottle, a can, a PET bottle or the like.

As shown in FIG. 2, the center console 20 is provided with a storing hole 21, which is a traverse hole capable of storing the cap holder 10 therein.

The cup holder 10 is generally formed of, as shown in FIG. 2, a case 40, a slider 50, an arm 60 and a spring 70.

The case 40 has a size to be accommodated in the storing hole 21 of the center console 20, as shown in FIG. 2, and the case 40 is fixed in the condition that the case 40 is accommodated in the storing hole 21.

The case 40 in the condition that it is accommodated in the storing hole 21, together with the storing hole 21, constitutes a storing section.

More particularly, as shown in FIG. 2, the case 40 has a box shape having an open front surface, and is formed of a case main body 80 having an open upper surface and a lid 90 for closing the open upper surface of the case main body 80.

The case main body 80 is provided with a bottom plate 81, a pair of right and left side plates 82 which vertically extend from the right and left ends of the bottom plate 81, and a rear plate which vertically extends from the rear end of the bottom plate 81, as shown in FIG. 2.

The slider 50 has a size to be accommodated in the case 40, and is slidably held in the case 40.

Right and left sides of the slider 50 are respectively cut into a C-shape so as to form a pair of right and left cup inserting holes 51. Side surfaces of the right and left cup inserting holes 51 are respectively opened outwardly toward right and left.

Although not shown in the figures, at the rearmost position of the slider 50 in which the slider 50 is pushed inside the case 40, the slider 50 is accommodated in the case 40, and the slider 50 is used at the foremost position in which the slider is drawn out forward by pulling a handle 52 at a front side thereof.

Although not shown in the figures, the rearmost position of the slider 50 is regulated at a position in which a rear surface of the slider 50 abuts against an inner surface of the rear plate 83 of the case 40. Also, the foremost position of the slider 50 is regulated such that a pair of right and left claws 53 protruding from an upper surface of the slider 50 abut against a portion of the lid 90 of the case 40.

Incidentally, the cup inserting hole 51 is not limited to the C-shape hole, and may be formed in a U-shape or rectangular hole.

The arm 60 has, generally as shown in FIGS. 1 and 2, a shaft 61, an arm main body 62, a tracing portion 63 and a spring 70.

As shown in FIG. 1, the shaft 61 is located at an intermediate portion of a length of the arm 60, and is fixed at a rear portion of the cup inserting hole 51 of the slider 50.

As shown in FIGS. 1 and 2, the arm main body 62 extends forward from the shaft 61, and is curved into a J-shape so as to constitute a part of an arc of the cup inserting hole 51. As shown in FIGS. 3 through 5, by rotating around the shaft 61, the arm main body 62 enters into and comes out from the cup inserting hole 51 through the open side surface or portion of the cup inserting hole 51.

In the condition that the arm main body 62 is deeply entered into the cup inserting hole 51 as shown in FIG. 3, an inner diameter of the entire cup inserting hole 51, which is surrounded by an inner peripheral surface of the cup inserting hole 51 and an inner surface of the arm main body 62, becomes the smallest. On the contrary, when the arm main body 62 is rotated around the shaft 61 in a counterclockwise direction to project from the open side surface of the cup inserting hole 51 as shown in FIG. 5, the inner diameter of the entire cup inserting hole 51 becomes the largest.

As shown in FIGS. 1 and 2, the tracing portion 63 extends in a direction opposite to the arm main body 62 with respect to the shaft 61 interposed therebetween, and a distal end of the tracing portion 63 is bent into an L-shape toward the inner surface of the side plate 82 of the case 40. The distal end of the tracing portion 63 bent into the L-shape is rounded into a hemispherical shape.

Also, as shown in FIG. 5, the slider 50 is provided with a stopper 54 projecting, for blocking, in a rotation range of the tracing portion 63. The tracing portion 63 abuts against the stopper 54, so that the stopper 54 regulates a largest diameter position of the inner diameter of the entire cup inserting hole 51.

As shown in FIGS. 1 and 2, the spring 70 is formed of a helical spring which is wound in a coil shape.

And, as shown in FIG. 1, the spring 70 fits around the shaft 61, and has one end fixed to the slider 50 and the other end fixed to the arm 60.

By a spring force for unwinding the spring 70, the arm 60 is urged around the shaft 61 in a clockwise direction, and the distal end of the tracing portion 63 is elastically pushed against the inner surface of the side plate 82 of the case 40.

Incidentally, although the spring 70 is formed of the helical spring in the embodiment, it is not limited to the helical spring, and a coil spring or leaf spring can be used as the spring 70.

On the other hand, a cam surface 100 protruding in a substantially trapezoidal shape is formed on the inner surface of the side plate 82 of the case 40 as shown in FIG. 1.

The cam surface 100 includes a slope 101 which gradually increases its height from the side plate 82.

When the slider 50 is drawn out from the case 40, the distal end of the tracing portion 63 follows the slope 101, so that the distal end of the tracing portion 63 is gradually moved away from the inner surface of the side plate 82.

As a result, as shown in FIG. 1, the arm main body 62 rotates around the shaft 61 in the counterclockwise direction against a restoring force of the spring 70.

At this time, the arm main body 62 projects from the open side surface of the cup inserting hole 51 as shown in FIG. 1. Also, the inner diameter of the entire cup inserting hole 51, which is surrounded by the inner peripheral surface of the cup inserting hole 51 and the inner surface of the arm main body 62, is enlarged.

As described above, the tracing portion 63 of the arm 60, the spring 70, and the cam surface 100 form diameter enlarging means for enlarging the inner diameter of the cup inserting hole 51, wherein the arm main body 62 is projected from the open side surface of the cup inserting hole 51 when the slider 50 is drawn out from the case 40.

Next, the direction for using the cup holder as structured above will be explained.

First, when the slider 50 is drawn out from the case 40, as shown in FIG. 1, the distal end of the tracing portion 63 traces the slope 101, so that the inner diameter of the entire cup inserting hole 51 is enlarged.

Thereafter, the cup 30 is inserted in the cup inserting hole 51 to be held therein as shown in FIG. 5.

At this time, in case an outer diameter of the cup 30 is large, the arm 60 is pushed by an outer periphery of the cup 30 to further rotate around the shaft 61 in the counterclockwise direction as shown in FIG. 5.

Thus, the inner diameter of the entire cup inserting hole 51 is further enlarged. Accordingly, the cup holder can correspond to the change in the outer diameter of the cup 30.

Also, a force of rotating the arm 60 around the shaft 61 in the clockwise direction is exerted by the restoring force of the spring 70, so that the arm main body 62 elastically abuts against the outer peripheral surface of the cup 30. Thus, the cap 30 is prevented from being shaken or moved in the cup inserting hole 51.

On the other hand, after use, when the cap 30 is taken out, the arm 60 is rotated around the shaft 61 in the clockwise direction by the restoring force of the spring 70 as shown in FIG. 1.

Thereafter, when the slider 50 is pushed inside the case 40, the distal end of the tracing portion 63 is returned to the inner surface of the base plate 82 of the case 40 from the cam surface 100 as shown in FIG. 3.

Thus, since the arm 60 is rotated around the shaft 61 in the clockwise direction by the restoring force of the spring 70, the arm 60 is retracted into the cup inserting hole 51.

Thus, although not shown in the figures, the slider 50 can be accommodated in the case 40.

Figure 6:
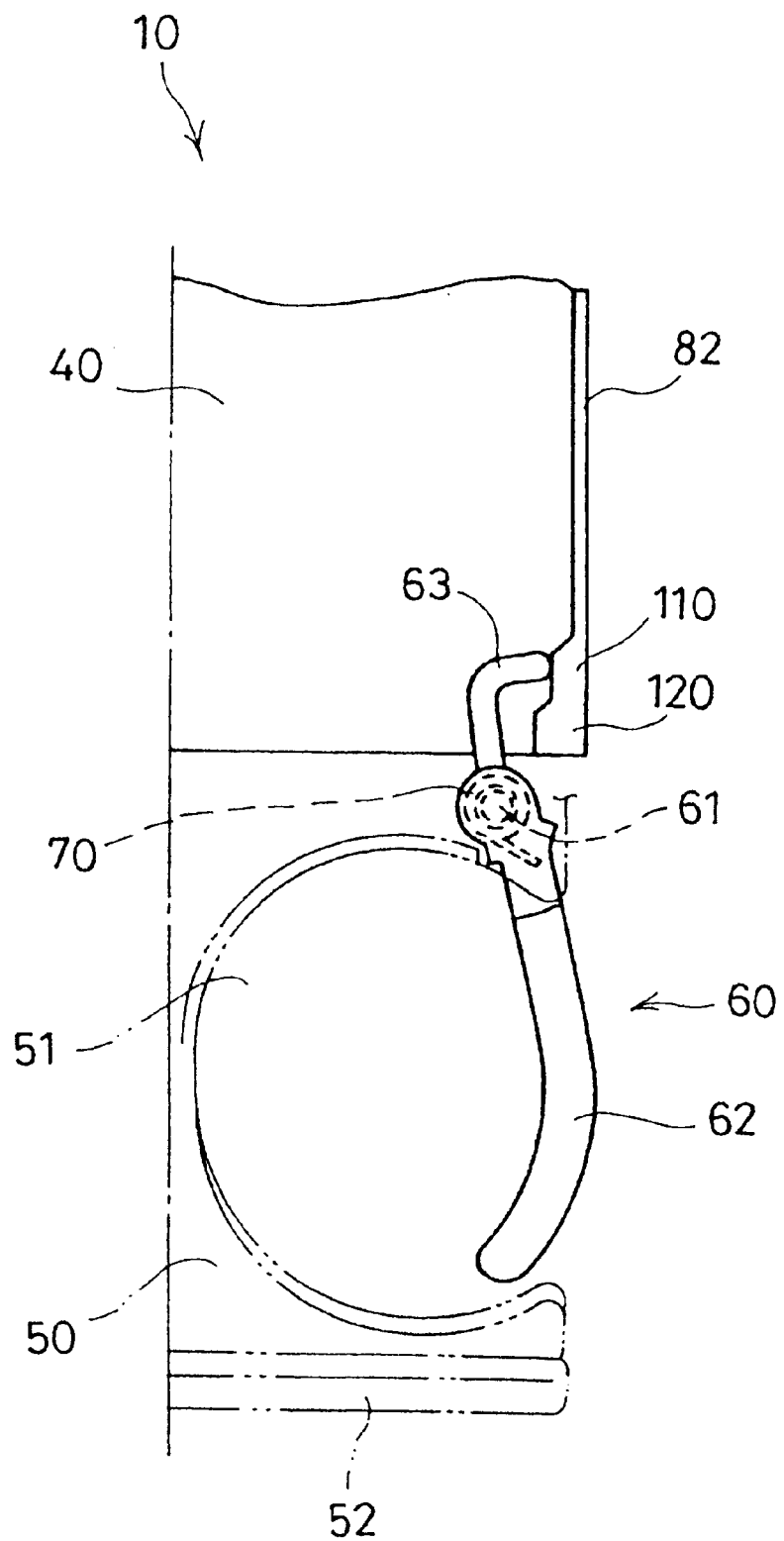
FIG. 6 is a partial plan view of a cup holder of a second embodiment of the present invention showing a condition that a slider is drawn out.
Figure 7:
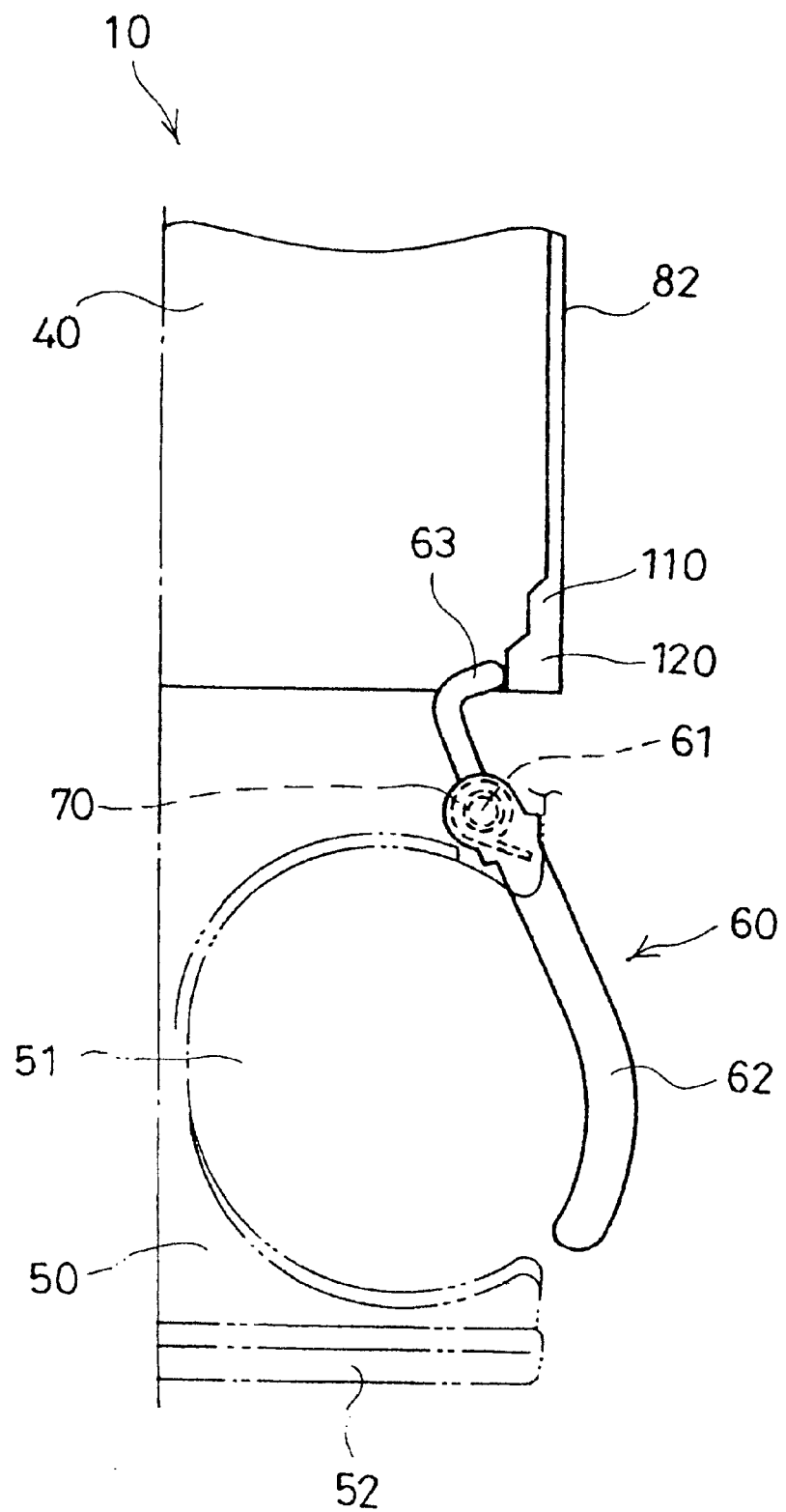
FIG. 7 is a partial plan view of the cup holder of the second embodiment corresponding to FIG. 6, showing a condition that the slider is further drawn out.

FIGS. 6 and 7 show a second embodiment of the present invention, wherein FIG. 6 is a partial plan view of a cup holder of the second embodiment showing a condition that a slider is drawn out; and FIG. 7 corresponds to FIG. 6 and is a partial plan view of the cup holder showing a condition that the slider is further drawn out.

In the second embodiment of the present invention, the cam surface is formed in a two-step form as shown in FIGS. 6 and 7.

Namely, as shown in FIGS. 6 and 7, a cam surface of the present embodiment is formed of a first cam surface 110 which is protruded from the inner surface of the side plate 82, and a second cam surface 120 which is further protruded from the first cam surface 110 as a first step.

According to the present embodiment, when the slider 50 is drawn out from the case 40 for one step, the distal end of the tracing portion 63 is moved onto the first cam surface 110 to enlarge the inner diameter of the entire cup inserting hole 51 as shown in FIG. 6.

Then, as shown in FIG. 7, when the slider 50 is further drawn out from the case 40, the distal end of the tracing portion 63 is moved onto the second cam surface 120, so as to further enlarge the inner diameter of the entire cup inserting hole 51.

Accordingly, an amount of drawing of the slider 50 is controlled according to the outer diameter of the cup 30, so that the inner diameter of the entire cup inserting hole 51 can be changed.

Incidentally, although the cam surface is formed into two steps in the present embodiment of the invention, the cam surface may be formed of three or more steps.

Since the present invention is structured as described above, the present invention has the following effects.

According to the first aspect of the invention, since the rotation of the arm is controlled by the cam surface while utilizing a sliding motion of the slider, a generation of the noise can be prevented.

In addition to the above effect, according to the second aspect of the invention, since the cam surface is formed of multiple steps, an amount of enlarging the inner diameter of the cup inserting hole can be changed in correspondence with the amount of drawing of the slider.

While the invention has been explained with reference to the specific embodiments of the invention, the explanation is illustrative and the invention is limited only by the appended claims.

What is claimed is:

1. A cup holder for a vehicle, comprising:

a storing portion to be disposed in the vehicle, a slider slidably held in the storing portion and having a cup inserting hole with an open side, a shaft attached to the slider near the open side, an arm rotatably attached to the shaft and disposed at the open side so that when a position of the arm at the open side is changed, an inner diameter of the cup inserting hole is changed, and diameter changing means for moving the arm when the slider is drawn from the storing portion and changing the inner diameter of the cup inserting hole, said diameter changing means including a tracing portion attached to the arm at a side opposite thereto relative to the shaft and extending along an inner surface of the storing portion, a spring attached to the arm for urging the tracing portion toward the inner surface of the storing portion and allowing an end of the arm to rotate in a direction of reducing the inner diameter of the cup inserting hole, and a cam surface protruding from the inner surface of the storing portion, said tracing portion contacting the cam surface when the slider is drawing from the storing portion so that the end of the arm is rotated in a direction of enlarging the inner diameter of the cup inserting hole.

2. A cup holder according to claim 1, wherein said cam surface includes a plurality of steps protruding from the inner surface of the storing portion.

3. A cup holder according to claim 1, wherein said cam surface is formed at the inner surface near an exit of the storing portion so that after the arm is withdrawn from the storing portion, the arm is enlarged by the cam surface.

4. A cup holder according to claim 3, wherein said slider includes a stopper situated near the tracing portion, said tracing portion engaging the stopper to limit movement of the arm.

5. A cup holder according to claim 4, wherein said slider further includes a craw engaging a part of the storing portion to limit a maximum withdrawing movement of the slider.

* * * * *